United States Patent
Baba et al.

(10) Patent No.: US 8,651,515 B2
(45) Date of Patent: Feb. 18, 2014

(54) OCCUPANT PROTECTION APPARATUS AND OCCUPANT PROTECTION METHOD

(75) Inventors: Noriyoshi Baba, Tokyo (JP); Isamu Nagasawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 733 days.

(21) Appl. No.: 13/402,160

(22) Filed: Feb. 22, 2012

(65) Prior Publication Data

US 2012/0217731 A1    Aug. 30, 2012

(30) Foreign Application Priority Data

Feb. 28, 2011    (JP) ................. 2011-042649

(51) Int. Cl.
B60R 21/207    (2006.01)
B60R 21/233    (2006.01)

(52) U.S. Cl.
USPC ....................... 280/730.2; 280/729

(58) Field of Classification Search
USPC ............................... 280/730.2, 729
See application file for complete search history.

(56) References Cited

U.S. PATENT DOCUMENTS

| | | | | |
|---|---|---|---|---|
| 5,575,497 A * | 11/1996 | Suyama et al. | ............. | 280/730.1 |
| 5,913,536 A | 6/1999 | Brown | | |
| 6,142,521 A * | 11/2000 | Shephard | ................. | 280/748 |
| 6,158,767 A * | 12/2000 | Sinnhuber | .................. | 280/730.2 |
| 6,428,041 B1 | 8/2002 | Wohllebe et al. | | |
| 7,048,300 B2 * | 5/2006 | Honda et al. | .............. | 280/730.2 |
| 7,264,269 B2 * | 9/2007 | Gu et al. | .................. | 280/730.2 |
| 7,316,415 B2 * | 1/2008 | Jamison | .................. | 280/729 |
| 7,461,862 B2 | 12/2008 | Hasebe et al. | | |
| 7,475,904 B2 | 1/2009 | Hofmann et al. | | |
| 7,549,672 B2 * | 6/2009 | Sato et al. | .................. | 280/730.2 |
| 7,594,678 B2 * | 9/2009 | Schedler | .................. | 280/743.2 |
| 7,611,164 B2 * | 11/2009 | Kai et al. | .................... | 280/729 |
| 7,618,057 B2 | 11/2009 | Pinsenschaum et al. | | |
| 7,661,702 B2 * | 2/2010 | Ochiai et al. | ............... | 280/730.2 |
| 7,681,907 B2 * | 3/2010 | Svenbrant et al. | ......... | 280/728.2 |
| 7,918,482 B2 | 4/2011 | Sugimoto et al. | | |
| 7,946,616 B2 | 5/2011 | Ochiai et al. | | |
| 7,988,187 B2 * | 8/2011 | Yamamura et al. | ........ | 280/730.2 |
| 8,186,708 B2 * | 5/2012 | Zhou et al. | .................. | 280/730.2 |
| 8,322,747 B2 * | 12/2012 | Shankar | ........................ | 280/729 |
| 2003/0178831 A1 * | 9/2003 | Roberts et al. | ............. | 280/743.1 |
| 2004/0232666 A1 * | 11/2004 | Sato et al. | .................. | 280/730.2 |
| 2009/0001695 A1 * | 1/2009 | Suzuki et al. | .............. | 280/730.2 |
| 2010/0264630 A1 * | 10/2010 | Walston | ....................... | 280/730.2 |
| 2011/0169250 A1 * | 7/2011 | Breuninger et al. | ....... | 280/730.2 |
| 2011/0241322 A1 * | 10/2011 | Nozaki et al. | .............. | 280/730.2 |
| 2012/0217730 A1 | 8/2012 | Baba et al. | | |

FOREIGN PATENT DOCUMENTS

JP    2008-201172    9/2008
JP    2011-1051    1/2011

* cited by examiner

*Primary Examiner* — Ruth Ilan
*Assistant Examiner* — Joselynn Y Sliteris
(74) *Attorney, Agent, or Firm* — Smith, Gambrell & Russell, LLP.

(57) ABSTRACT

A side airbag apparatus includes an airbag that can form a plurality of chambers with a single inflator and protects an occupant from an impact on a side door by deploying the airbag between the occupant and the side door. The chambers of the airbag includes an upper chamber and a lower chamber that can be deployed above and below a door arm rest in a vehicle vertical direction, and a chest chamber 12c that is disposed closer to the inner side of an occupant compartment in the vehicle width direction than the upper and lower chambers and can be deployed around a chest region of the occupant.

11 Claims, 7 Drawing Sheets

OCCUPANT PROTECTION APPARATUS AND OCCUPANT PROTECTION METHOD

CROSS REFERENCES TO RELATED APPLICATIONS

The present application claims priority from Japanese Patent Application No. 2011-042649 filed on Feb. 28, 2011, the entire contents of which are hereby incorporated by reference.

BACKGROUND OF THE INVENTION

1. Field of the Invention

The present invention relates to occupant protection apparatuses and occupant protection methods, particularly relates to an occupant protection apparatus and an occupant protection method that have an airbag in which a plurality of chambers can be formed with a single inflator and protect an occupant from a shock of a side impact on a vehicle sidewall by deploying the airbag between a vehicle sidewall and the occupant.

2. Description of the Related Art

An occupant protection apparatus usually has an airbag in which a single chamber is formed with a single inflator and protects an occupant from a shock of a side impact on a vehicle sidewall by deploying the airbag between a vehicle sidewall and the occupant.

Such an occupant protection apparatus having an airbag in which a single chamber is formed with a single inflator can secure a space between the vehicle sidewall and the occupant by, for example, increasing the thickness of the airbag in the vehicle width direction, whereby occupant safety against a side impact can be enhanced.

As for the enhancement of occupant safety against a side impact by securing a space between the vehicle sidewall and the occupant, since the vehicle sidewall shifts towards an occupant compartment in the vehicle width direction upon a side impact, the airbag is deployed between the vehicle sidewall and the occupant so as to prevent the vehicle sidewall from contacting with the occupant.

However, if the thickness of the airbag is increased in the vehicle width direction, the airbag may hit a component such as a door arm rest disposed in the space between the vehicle sidewall and the occupant upon the deployment of the airbag. Therefore, the airbag cannot be reliably deployed between the vehicle sidewall and the occupant should be addressed.

For this problem, the airbag is less likely to hit the component in the space if the thickness of the airbag in the vehicle width direction is decreased. However, a space cannot be secured between the vehicle sidewall and the occupant.

As a countermeasure for reliably deploying the airbag between the vehicle sidewall and the occupant and securing the space between the vehicle sidewall and the occupant, a plurality of side airbag apparatuses could be used, for example.

However, if a plurality of side airbags apparatuses is used, an additional component such as a control unit is required to control the timing of deploying each airbag, whereby the entire configuration becomes complicated.

The addition of the component such as a control unit also leads to cost increase. Moreover, when a plurality of airbag apparatuses is used, the airbags thereof may interfere with each other.

Recently, therefore, in order to achieve an occupant protection apparatus with a simple configuration, there have been needs for an occupant protection apparatus that has an airbag in which a plurality of chambers can be formed with a single inflator and secures a space between an occupant and a vehicle sidewall by reliably deploying the chambers.

In order to achieve an occupant protection apparatus with a simple configuration, for example, Japanese Unexamined Patent Application Publication (JP-A) No. 2008-201172 discloses a side airbag apparatus that has a high-pressure bag and a low-pressure bag that are deployed by a single inflator. When the bags deployed, the high-pressure bag is deployed first, and then the low-pressure bag is deployed.

In addition, JP-A No. 2011-001051 discloses a side airbag apparatus that has an upper chamber configured to be deployed towards above an arm rest and a lower chamber configured to be deployed towards below the arm rest.

Since the side airbag apparatus according to JP-A No. 2008-201172 deploys the high-pressure bag and the low-pressure bag with the single inflator and protects a chest region of the occupant by the low-pressure bag, the high-pressure bag may hit the arm rest. Therefore, the side airbag apparatus according to JP-A No. 2008-201172 should be improved to reliably deploy the high-pressure bag.

In addition, while the side airbag apparatus according to JP-A No. 2011-001051 deploys the upper and lower chambers such that they do not hit the arm rest, the chambers do not protect the chest region of the occupant. Therefore, the side airbag apparatus according to JP-A No. 2011-001051 should be improved to enhance safety upon protecting the occupant from the shock of a side impact on the vehicle sidewall.

SUMMARY OF THE INVENTION

The present invention is made in view of the above, and it is an object of the present invention to provide an occupant protection apparatus and an occupant protection method that has an airbag in which a plurality of chambers can be formed with a single inflator, the apparatus and the method enhancing safety upon protecting an occupant from a shock of a side impact on a sidewall by securing a space between a vehicle sidewall and an occupant and protecting the chest region of the occupant.

In order to solve the above-mentioned problems, an aspect of the present invention provides an occupant protection apparatus that includes an airbag in which a plurality of chambers can be formed with a single inflator, and protects an occupant from a shock of a side impact on a vehicle sidewall by deploying the airbag between the vehicle sidewall and the occupant. The plurality of chambers of the airbag includes a door arm rest chamber that can be deployed above and below a door arm rest in the vehicle vertical direction, and a chest chamber that is disposed closer to the inner side of an occupant compartment in the vehicle width direction than the door arm rest chamber and can be deployed around a chest region of the occupant.

Another aspect of the present invention provides an occupant protection apparatus that includes an airbag in which a plurality of chambers can be formed with a single inflator, and protects an occupant from a shock of a side impact on a vehicle sidewall by deploying the airbag between the vehicle sidewall and the occupant. The plurality of chambers of the airbag includes a door arm rest chamber that can be deployed towards an occupant-compartment-side surface of a door arm rest in the vehicle width direction, and a chest chamber that is disposed closer to the inner side of an occupant compartment in the vehicle width direction than the door arm rest chamber and can be deployed around a chest region of the occupant.

Preferably, the airbag of the occupant protection apparatus according to the present invention should include a pressure valve that allows a communication between the door arm rest chamber and the chest chamber when a pressure of supply gas provided to the door arm rest chamber by the inflator reaches a predetermined pressure in the door arm rest chamber.

Preferably, the door arm rest chamber of the airbag of the occupant protection apparatus according to the present invention should include an upper chamber that can be deployed above the door arm rest and a lower chamber that can be deployed below the door arm rest.

In order to solve the above-mentioned problems, further another aspect of the present invention provides an occupant protection method that protects an occupant from a shock of a side impact against a vehicle sidewall by deploying an airbag between the vehicle sidewall and the occupant, the airbag including a plurality of chambers that are formed with a single inflator. At least one of the chambers should be deployed above and below the door arm rest in the vehicle vertical direction, and at least another of the chambers should be deployed so as to protect a chest region of the occupant.

DESCRIPTION OF THE PREFERRED EMBODIMENTS

Embodiments of the present invention will hereunder be described with reference to the drawings.

Embodiment 1

FIGS. 1 to 4C relate to a side airbag apparatus 10 according to an embodiment of the present invention. The side airbag apparatus 10 has an airbag 12 that can form a plurality of chambers with a single inflator 11. An occupant is protected from a shock of a side impact on a side door 20 (vehicle sidewall) by deploying the airbag 12 between the side door 20 and the occupant.

Thus, the side airbag apparatus 10 according to the present embodiment corresponds to an occupant protection apparatus of the present invention. A method of protecting the occupant with the side airbag apparatus 10 corresponds to an occupant protection method of the present invention.

Figure 1:
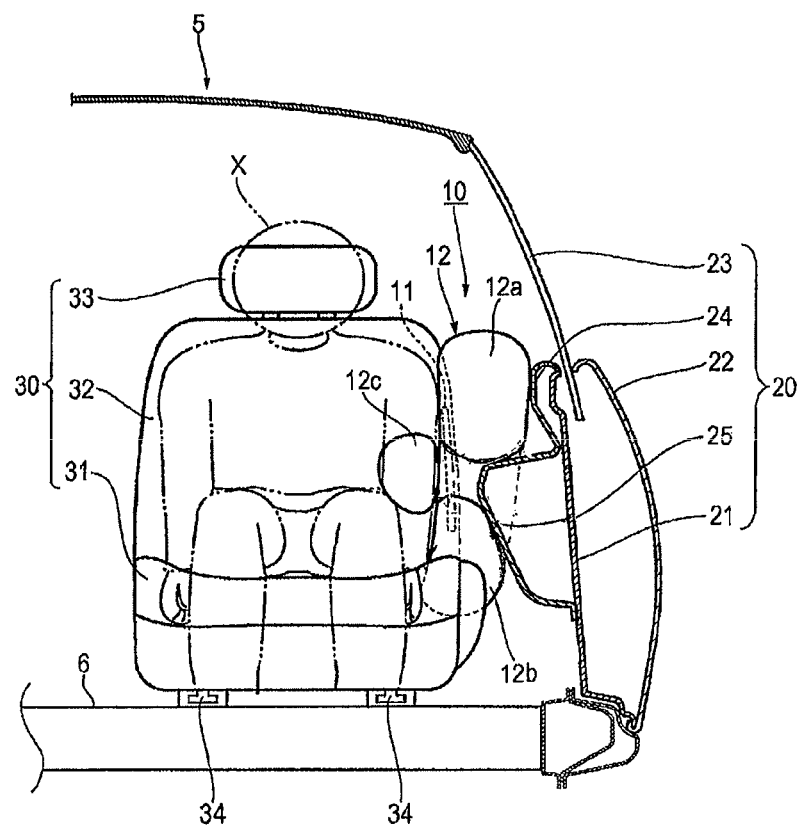
FIG. 1 shows a side door and a vehicle seat of a vehicle provided with an occupant protection apparatus according to an embodiment of the present invention and schematically shows a state in which an airbag of the occupant protection apparatus is deployed from a front side of the vehicle.

Firstly, the side door 20 and a vehicle seat 30 of a vehicle 5 provided with the side airbag apparatus 10 according to the present embodiment will be described with reference to FIGS. 1 and 2. FIG. 1 shows the side door 20 and the vehicle seat 30 of the vehicle 5 provided with the side airbag apparatus 10 according to the present embodiment, and schematically shows the vehicle 5 a state in which the side airbag 12 of the side airbag apparatus 10 is deployed. The view is seen from a front side of the vehicle 5.

Figure 2:
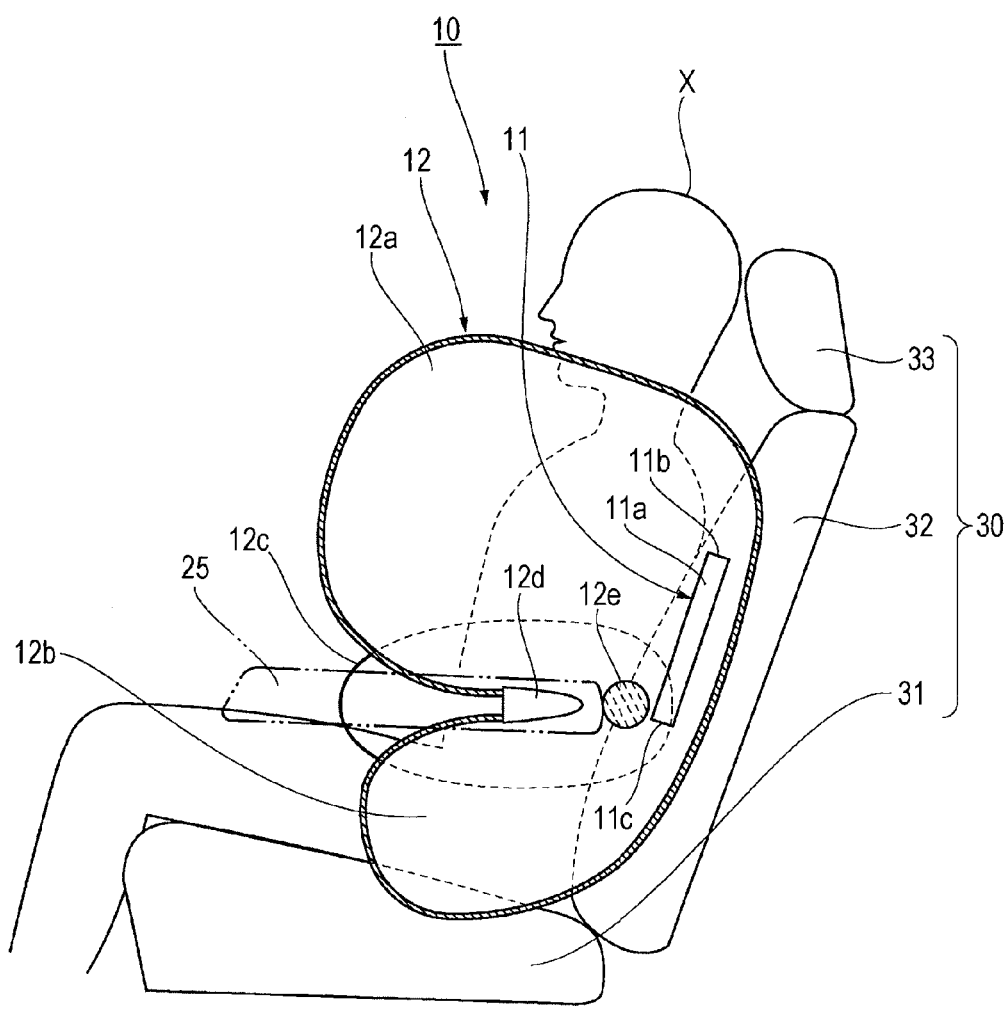
FIG. 2 shows the side door and the vehicle seat of the vehicle provided with the occupant protection apparatus according to the embodiment of the present invention and schematically shows the state in which the side air bag of the occupant protection apparatus is deployed from a lateral side of the vehicle.

FIG. 2 shows the side door 20 and the vehicle 30 of the vehicle 5 provided with the side airbag apparatus 10 according to the present embodiment, and schematically shows the vehicle 5 the state in which the side airbag 12 of the side airbag apparatus 10 is deployed. The view is seen from a lateral side of the vehicle 5.

As shown in FIGS. 1 and 2, the side door 20 of the present embodiment includes an inner panel 21 and an outer panel 22 that are part of a frame of the side door 20.

The side door 20 further includes a window glass 23 that is disposed between the inner panel 21 and the outer panel 22 and can vertically move therebetween in the vertical direction of the vehicle 5.

A door trim 24 is attached to the inner panel 21 that is part of the side door 20 at the occupant-compartment-side in the width direction of the vehicle 5. A door arm rest 25 is arranged in the door trim 24. The door arm rest 25 protrudes towards the occupant compartment in the vehicle width direction. The vehicle seat 30 on which an occupant is to sit is disposed on the occupant-compartment side of the door arm rest 25.

The vehicle seat 30 includes a seat cushion 31 on which the occupant is to sit and a seat back 32 on which the occupant is to lean. The seat back 32 is disposed at a posterior end of the seat cushion 31 in the longitudinal direction of the vehicle. The vehicle seat 30 further includes a head rest 33 that is disposed at an upper end of the seat back 32 in the vertical direction of the vehicle.

The seat cushion 31 is attached on a floor 6 of the vehicle 5 slidably in the longitudinal direction of the vehicle via a sliding mechanism 34. Thus, when an occupant uses the vehicle seat 30, the occupant can slide the vehicle seat 30 in the longitudinal direction of the vehicle according to the occupant's preference. As described above, the seat back 32 is disposed at the posterior end of the seat cushion 31.

The seat back 32 is attached to the seat cushion 31 via an unillustrated reclining mechanism. Thus, when an occupant uses the vehicle seat 30, the occupant can stand up or lay down the seat back 32 in the longitudinal direction of the vehicle according to the occupant's preference.

The side airbag apparatus 10 is disposed at an end of the seat back 32 on the side of side door 20 in the width direction of the vehicle 5. Specifically, the side airbag apparatus 10 is disposed such that the airbag 12 is deployed from the seat back 32 towards the side door 20 or forward in the longitudinal direction of the vehicle 5.

In the above description, the side airbag apparatus 10 of the present embodiment is disposed at the end of the seat back 32 on the side of side door 20 in the width direction of the vehicle 5. However, the present invention is not limited to this embodiment. Alternatively, for example, the side airbag apparatus 10 may be disposed at an end of the seat cushion 31 on the side of the side door 20 in the width direction of the vehicle 5.

Specifically, the side airbag apparatus 10 may be disposed such that the airbag 12 is deployed from the seat cushion 31 towards the side door 20 or upward in the vertical direction of the vehicle 5

The side airbag apparatus 10 includes the inflator 11 as a gas ejector and the airbag 12 that is connected to the inflator 11 and deployed with gas ejected from the inflator 11. The side airbag apparatus 10 further includes an unillustrated case for housing the inflator 11 and the airbag 12.

The side airbag apparatus 10 is attached to an unillustrated frame of the seat back 32. The frame has a cover covering thereof. Thus, the side airbag apparatus 10 is embedded inside the seat back 32.

The side airbag apparatus 10 further includes an unillustrated sensor that detects a shock due to a side impact on the side door 20. The sensor is connected to an unillustrated control circuit. The control circuit controls the inflator 11 based on a detection signal from the sensor.

The inflator 11 of the present embodiment includes an inflator case 11a arranged along the vertical direction of the vehicle 5 and an unillustrated explosive contained in the inflator case 11a.

The inflator case 11a includes a first gas supply port 11b and a second gas supply port 11c that are disposed at ends of the inflator case 11a in the axial direction and eject supply gas generated in the inflator case 11a into the airbag 12.

Thus, the gas supply direction of the first gas supply port 11b of the inflator 11 is arranged so as to provide supply gas to a later-described upper chamber 12a of the airbag 12. The gas supply direction of the second gas supply port 11c of the inflator 11 is arranged so as to provide supply gas to a later-described lower chamber 12b of the airbag 12.

The side airbag apparatus 10 may include an unillustrated inner tube that changes the ejecting direction of supply gas ejected from the first and second gas supply ports 11b and 11c of the inflator 11 according to a deployment state of the airbag 12.

Thus, the side airbag apparatus 10 initiates the deployment of the airbag 12 by providing supply gas into the airbag 12 with the inflator 11 controlled by the control circuit.

While the airbag 12 is to be deployed between the side door 20 and the occupant sitting on the vehicle seat 30 by supply gas provided by the inflator 11 as described above, it is housed in the case at normal times.

Specifically, the airbag 12 of the present embodiment is housed in the case such that it is folded in a rolled state. However, the present invention is not limited to this. Alternatively, for example, the airbag 12 may be housed such that it is folded in a concertina shape.

The airbag 12 is formed in a pouched shape by sewing the outer peripheral edges of a pair of base fabric pieces that are made with fire-proofed woven cloth. Any one of the pair of base fabric pieces has formed therein an unillustrated vent hole that allows a communication between the outside and the upper chamber 12a, the lower chamber 12b and a chest chamber 12c, which will be described later.

Thus, the airbag 12 can discharge supply gas provided by the inflator 11 into the upper chamber 12a, the lower chamber 12b and the chest chamber 12c of the airbag 12 to the outside through the vent hole.

In the above description, the airbag 12 is formed in a pouched shape by sewing the outer peripheral edges of a pair of base fabric pieces. However, the present invention is not limited to this, and alternatively, for example, the airbag 12 may be formed in a pouched shape by adhering or welding the outer peripheral edges of a pair of base fabric pieces.

The vent hole of the airbag 12 is formed in any one of the pair of base fabric pieces. However, the present invention is not limited to this, and alternatively, for example, both of the pair of base fabric pieces may have formed therein a vent hole. Furthermore, the vent hole may be formed in any location as far as supply gas provided by the inflator 11 into the upper chamber 12a, the lower chamber 12b and the chest chamber 12c of the airbag 12 can be discharged to the outside.

In the present embodiment, the airbag 12 includes the upper chamber 12a and the lower chamber 12b (door arm rest chambers) that can be deployed respectively above and below the arm rest 25 in the vertical direction of the vehicle 5, and the chest chamber 12c that can be deployed around a chest region of an occupant.

The airbag 12 further includes a non-inflated portion 12d between the upper chamber 12 and the lower chamber 12b so as to defining these chambers.

The inflator 11 is arranged near the non-inflated portion 12d. Thus, the side airbag apparatus 10 can deploy the upper chamber 12a and the lower chamber 12b separately across the non-inflated portion 12d with the first and second gas supply ports 11b and 11c of the inflator 11 respectively.

The inflator 11 is arranged on a same level with the arm rest 25 in the vertical direction of the vehicle 5. Thus, the non-inflated portion 12d is arranged so as to be deployed on the same level with the arm rest 25 in the vertical direction of the vehicle 5. As described above, the airbag 12 includes the upper chamber 12a and the lower chamber 12b which are arranged across the non-inflated portion 12d.

As a result, when the airbag 12 of the side airbag apparatus 10 is deployed, the upper and lower portions thereof are deployed separately with the door arm rest 25 therebetween, whereby the airbag 12 is can be deployed such that it does not hit the door arm rest 25.

Therefore, even if the upper chamber 12a and the lower chamber 12b of the airbag 12 in the side airbag apparatus 10 has an increased thickness in the width direction of the vehicle 5, the airbag 12 is can be deployed such that it does not hit the door arm rest 25 as described above.

As a result, according to the side airbag apparatus 10 of the present embodiment, by increasing the thickness of the upper chamber 12a and the lower chamber 12b in the width direction of the vehicle 5, a space can be secured between the side door 20 and the occupant, that is, the occupant can remain at a distance from the side door 20, whereby safety against a side impact can be enhanced.

As described above, the upper chamber 12a and the lower chamber 12b of the side airbag apparatus 10 of the present embodiment are configured to be deployed respectively above and below the door arm rest 25.

Specifically, the upper chamber 12a presses a shoulder region of the occupant, while the lower chamber 12b presses a buttock region of the occupant. Since the chambers 12a and 12b do not press a chest region of the occupant, a chest injury criterion may become higher. Therefore, in order to reduce the chest injury criterion, a countermeasure is required to press the occupant across from the shoulder region to the buttock region evenly.

Accordingly, as described above, in addition to the upper chamber 12a and the lower chamber 12b, the airbag 12 of the side airbag apparatus 10 of the present embodiment includes the chest chamber 12c that can be deployed around the chest region of the occupant.

Figure 4A:
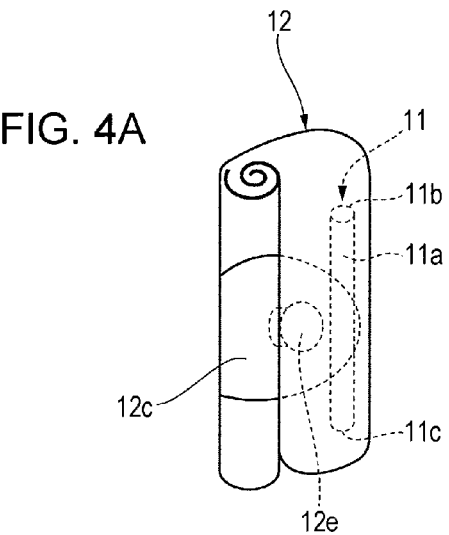
FIG. 4A is a perspective view schematically showing the first state of the occupant protection apparatus according to the embodiment of the present invention.
Figure 4B:
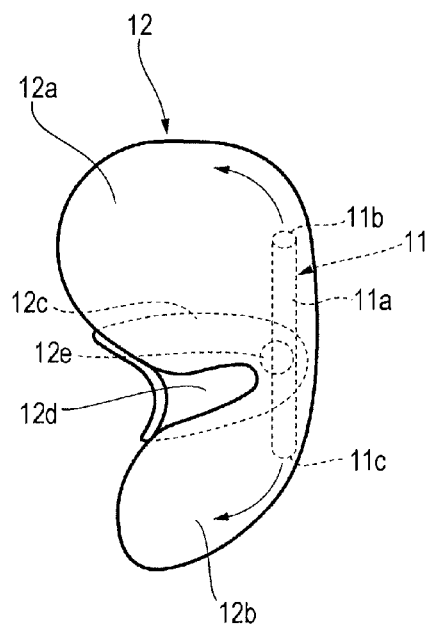
FIG. 4B is a perspective view schematically showing the second state of the occupant protection apparatus according to the embodiment of the present invention.
Figure 4C:
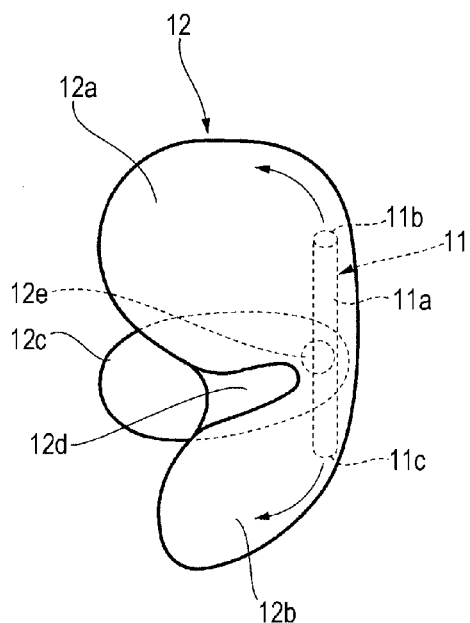
FIG. 4C is a perspective view schematically showing the third state of the occupant protection apparatus according to the embodiment of the present invention.

Specifically, the airbag 12 includes a pressure valve 12e adjacent to the upper chamber 12a, the lower chamber 12b and the chest chamber 12c; and in the embodiment shown in FIG. 4C, the pressure valve is positioned at the rearward end of the deployed chest chamber. The pressure valve 12e is made of a fabric piece that is thinner than the base fabric pieces of the airbag 12.

Thus, the pressure valve 12e is torn when supply gas is provided to the upper 12a and the lower chamber 12b by the inflator 11 and pressures therein become high.

After the pressure valve 12e is torn, supply gas is also provided to the chest chamber 12c by the inflator 12.

As a result, according to the side airbag apparatus 10 of the present embodiment, by deploying the chest chamber 12c around the chest region of the occupant, a space can be secured between the side door 20 and the occupant, that is, the occupant can remain at a distance from the side door 20, whereby safety against a side impact can be enhanced.

Furthermore, since the side airbag apparatus 10 can evenly press the occupant across from the shoulder region to the buttock region, the chest injury criterion can be reduced.

Furthermore, the side airbag apparatus 10 deploys the chest chamber 12c around the chest region of the occupant, thereby protecting the chest region of the occupant. As a result, safety upon protecting the occupant from the shock of a side impact on the side door 20 can be enhanced.

In the above description, the pressure valve 12e of the present embodiment is made of the fabric piece that is thinner than the base fabric pieces of the airbag 12. However, the present invention is not limited to this embodiment. Alternatively, for example, the pressure valve 12e may be made of a same fabric piece as the airbag 12 by sewing it loosely with large stitches.

In the case in which the fabric piece of the pressure valve 12e is stitched loosely, the pressure valve 12e becomes unfastened when supply gas is provided to the upper 12a and the lower chamber 12b by the inflator 11 and pressures therein become high.

As described above, the side airbag apparatus 10 of the present embodiment includes the airbag 12 which can deploy the upper chamber 12a, the lower chamber 12b and the chest chamber 12c with the single inflator 11. By the use of the upper chamber 12a, the lower chamber 12b and the chest chamber 12c, a space is secured between the side door 20 and the occupant, and the chest region of the occupant is protected. As a result, safety upon protecting the occupant from the shock of a side impact against the side door 20 can be enhanced.

Furthermore, the side airbag apparatus 10 of the present embodiment does not use another inflator other than the inflator 11 to deploy the airbag 12 to the chest region of the occupant where airbag deployment is difficult. In other words, the side airbag apparatus 10 can deploy the airbag 12 to a difficult region with a simple configuration. As a result, the side airbag apparatus 10 can achieve cost reduction.

Figure 3A:
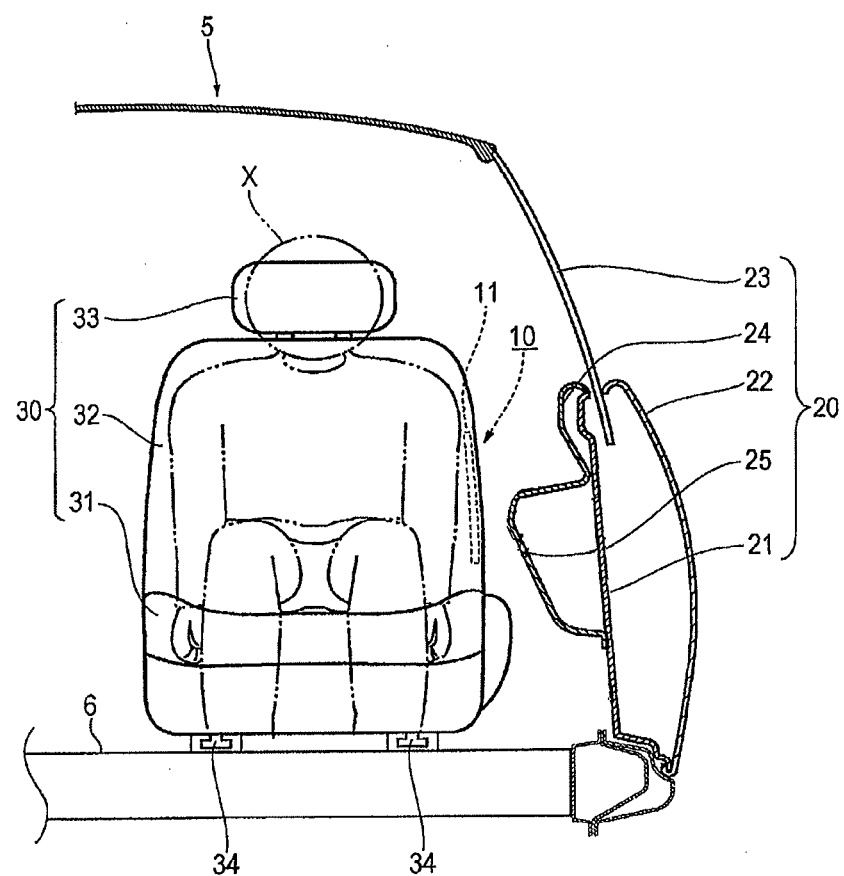
FIG. 3A schematically shows a first state of the occupant protection apparatus according to the embodiment of the present invention from the front side of the vehicle.
Figure 3B:
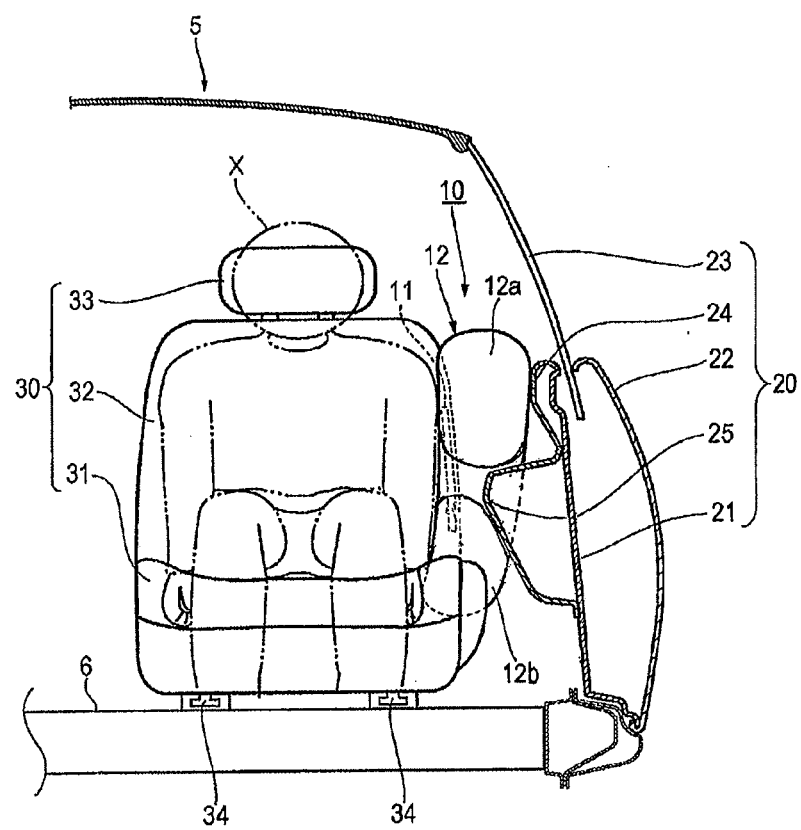
FIG. 3B schematically shows a second state of the occupant protection apparatus according to the embodiment of the present invention from the front side of the vehicle.
Figure 3C:
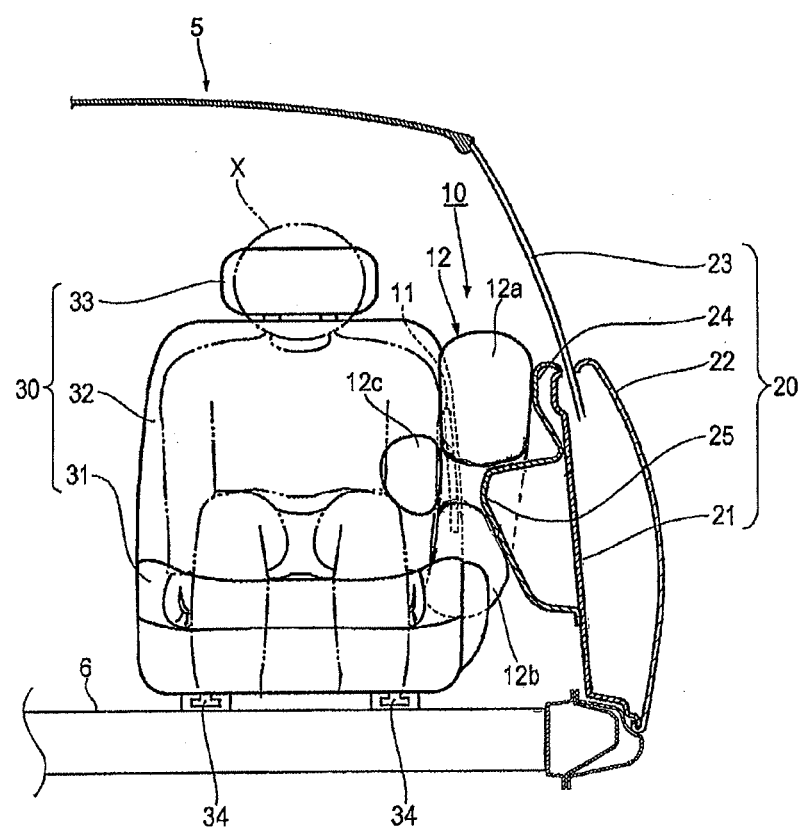
FIG. 3C schematically shows a third state of the occupant protection apparatus according to the embodiment of the present invention from the front side of the vehicle.

Next, the operation of the side airbag apparatus 10 of the present embodiment as well as a method of protecting the occupant therewith will be explained with reference to FIGS. 3A, 3B, 3C, 4A, 4B and 4C. FIG. 3A schematically shows a first state of the side airbag apparatus 10 according to the present embodiment. The view is seen from a front side of the vehicle. FIG. 3B schematically shows a second state of the side airbag apparatus 10 according to the present embodiment. The view is seen from the front side of the vehicle. FIG. 3C schematically shows a third state of the side airbag apparatus 10 according to the present embodiment. The view is seen from the front side of the vehicle.

FIG. 4A is a perspective view schematically showing the first state of the airbag 12 of the side airbag apparatus 10 according to the present embodiment. FIG. 4B is a perspective view schematically showing the second state of the airbag 12 of the side airbag apparatus 10 according to the present embodiment. FIG. 4C is a perspective view schematically showing the third state of the airbag 12 of the side airbag apparatus 10 according to the present embodiment.

As exemplified in FIGS. 3A and 4A, at normal times the airbag 12 of the side airbag apparatus 10 is housed in an unillustrated case such that it is folded in a rolled state. However, this present invention is not limited to this. Alternatively, for example, the airbag 12 of the present embodiment may be housed such that it is folded in a concertina shape.

As exemplified in FIGS. 3B and 4B, when the unillustrated sensor detects an impact larger than a predetermined magnitude due to a side impact on the side door 20, the unillustrated control circuit provides an actuating signal to the inflator 11.

Acknowledging the actuating signal from the control circuit, the inflator 11 provides supply gas into the airbag 12, whereby the deployment of the airbag 12 is initiated. Then supply gas is provided to the upper chamber 12a from the first gas supply port 11b and to the lower chamber from the second gas supply port 11c.

At this time, the inflator 11 is arranged near the non-inflated portion 12d. The non-inflated portion 12d is arranged on the same level with the arm rest 25 in the vertical direction of the vehicle 5.

Thus, in the side airbag apparatus 10, supply gas is provided to the upper chamber 12a and the lower chamber 12b from the proximity of the non-inflated portion 12d, whereby the upper chamber 12a and the lower chamber 12b can be deployed respectively above and below the door arm rest 25 with the door arm rest 25 therebetween.

As a result, the side airbag apparatus 10 can deploy the airbag 12 such that it does not hit the door arm rest 25, whereby the airbag 12 can be reliably deployed.

At this time, as described above, the side airbag apparatus 10 can deploy the upper chamber 12a and the lower chamber 12b such that they do not hit the door arm rest 25, whereby the width of the chambers in the width direction of the vehicle 5 can be made substantially same as that of the width between the side door 20 and the occupant.

As a result, by the use of the side airbag apparatus 10, a space can be secured between the side door 20 and the occupant, that is, the occupant can remain at a distance from the side door 20, whereby safety against a side impact can be enhanced.

As exemplified in FIGS. 3C and 4C, the pressure valve 12e of the airbag 12 of the present embodiment is released when the pressures in the upper chamber 12a and the lower chamber 12b become high due to the supply gas provided by the inflator 11.

Due to the release of the pressure valve 12 of the airbag 12, supply gas is provided to the chest chamber 12c by the inflator 11. The chest chamber 12c of the present embodiment is configured to be deployed around the chest region of the occupant.

As a result, by deploying the chest chamber 12 around the chest region of the occupant, a space can be secured between the side door 20 and the occupant, that is, the occupant can remain at a distance from the side door 20, whereby safety against a side impact can be enhanced.

Furthermore, by deploying the chest chamber 12 around the chest region of the occupant, it is possible to evenly press the occupant across from the shoulder region to the buttock region with the upper chamber 12a, the lower chamber 12b and the chest chamber 12c, whereby the chest injury criterion can be reduced.

Furthermore, since the deployment of the chest chamber 12 is initiated after the upper chamber 12a and the lower chamber 12b are deployed, the chest chamber 12c can be deployed with a lower pressure than those for deploying the upper chamber 12a and the lower chamber 12b.

Since the side airbag apparatus 10 can deploy the chest chamber 12c with a low pressure, a pressing force applied onto the occupant by the chest chamber 12c can be reduced.

As a result, according to the side airbag apparatus 10, it is possible to reduce the chest injury criterion of the chest chamber 12c to the occupant, whereby safety against a side impact on the side door 20 can be enhanced.

As described above, upon a side impact against the side door 20, the side airbag apparatus 10 according to the present embodiment includes the airbag 12 that forms the upper chamber 12a, the lower chamber 12b and the chest chamber 12c with the single inflator 11. By the use of the upper chamber 12a, the lower chamber 12b and the chest chamber 12c, a space is secured between the side door 20 and an occupant, and the chest region of the occupant is protected, whereby safety against the shock of a side impact against the side door 20 can be enhanced.

Furthermore, by the use of the occupant protection method of the present embodiment that protects an occupant by the deployment of the airbag 12 of the side airbag apparatus 10, safety against the shock of a side impact on the side door 20 can be enhanced.

Embodiment 2

Figure 5:
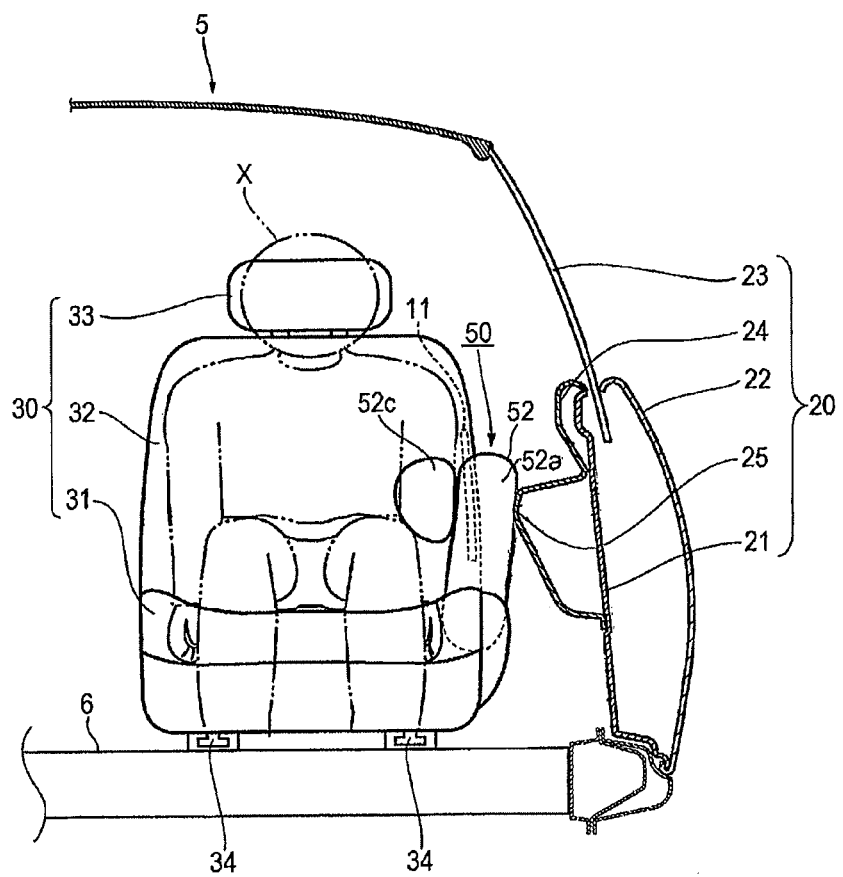
FIG. 5 shows a side door and a vehicle seat of a vehicle provided with an occupant protection apparatus according to another embodiment of the present invention and schematically shows a state in which an airbag of the side air bag apparatus is deployed from a front side of the vehicle.

Next, another embodiment of the present invention will be described with reference to FIG. 5. FIG. 5 shows a side door 20 and a vehicle seat 30 of a vehicle 5 provided with a side airbag apparatus 50 according to the other embodiment of the present invention and schematically shows a state in which an airbag 52 of the side airbag apparatus 50 is deployed. The view is seen from the front side of the vehicle.

The side airbag apparatus 50 is different from the side airbag apparatus 10 of above-described Embodiment 1 in that a door arm rest chamber 52a of the airbag 52 includes a single chamber and that the door arm rest chamber 52a is deployed towards the door arm rest 25. Other features of the configuration of the side airbag apparatus 50 are same as those of the side airbag apparatus 10. Therefore, components of the present embodiment that are similar to or correspond to those in Embodiment 1 are denoted by like reference numerals and descriptions thereof are omitted.

As exemplified in FIG. 5, the airbag 52 of the side airbag apparatus 50 of the present embodiment includes the door arm rest chamber 52a that can be deployed towards an occupant-compartment-side surface of a door arm rest 25 in the width direction of a vehicle 5 and a chest chamber 52c that can be deployed around a chest region of an occupant.

Since the side airbag apparatus 50 of the present embodiment deploys the door arm rest chamber 52a of the airbag 52 towards the occupant-compartment-side surface of the door arm rest 25 in the width direction of the vehicle 5, a space can be secured between the occupant and the door arm rest 25, which is a component located closest to the occupant, that is, the occupant can remain at a distance from the door arm rest 25.

As described above, the side airbag apparatus 50 of the present embodiment includes the airbag 52 that forms the door arm rest chamber 52a and the chest chamber 52c with a single inflator 11. By the use of the door arm rest chamber 52a and the chest chamber 52c a space is secured between the door arm rest 25 and the occupant, the chest region of the occupant is protected, whereby it is possible to protect the occupant from the shock of a side impact against a side door 20.

What is claimed is:

1. An occupant protection apparatus comprising:
   an airbag in which a plurality of chambers can be formed with a single inflator, wherein an occupant is protected from a shock of a side impact on a vehicle sidewall by deploying the airbag between the vehicle sidewall and the occupant; and
   wherein the plurality of chambers of the airbag comprises:
   a door arm rest chamber that can be deployed above and below a door arm rest in a vehicle vertical direction, and wherein the door arm rest chamber is configured to be deployed into direct contact with the occupant; and
   a chest chamber that is disposed closer to an inner side of an occupant compartment in a vehicle width direction than the door arm rest chamber and is configured to be deployed around a chest region of the occupant to secure a space between the vehicle sidewall and the occupant; and
   a pressure valve, that is in flow communication between the door arm rest chamber and the chest chamber, is positioned in a rearward region of the door arm rest chamber and is configured to provide for deployment of the chest chamber to secure the space between the vehicle sidewall and the chest region of the occupant.

2. The occupant protection apparatus according to claim 1, wherein the pressure valve provides for a communication between the door arm rest chamber and the chest chamber when a pressure of supply gas provided to the door arm rest chamber by the inflator reaches a predetermined pressure in the door arm rest chamber.

3. The occupant protection apparatus according to claim 2, wherein the pressure valve is positioned as to be at a rearward region of the chest chamber upon deployment of the chest chamber.

4. The occupant protection apparatus according to claim 1, wherein the door arm rest chamber of the airbag comprises an upper chamber that can be deployed above the door arm rest and a lower chamber that can be deployed below the door arm rest.

5. The occupant protection apparatus of claim 4 wherein said door arm rest chamber comprises a non-inflated portion positioned between the upper and lower chambers, and which non-inflated portion is arranged as to be deployed on a common level with the arm rest in the vertical direction.

6. The occupant protection apparatus of claim 1 wherein the inflator is arranged on a same level with the arm rest in the vehicle vertical direction.

7. An occupant protection method that protects an occupant from a shock of a side impact on a vehicle sidewall by deploying an airbag between the vehicle sidewall and the occupant,
   wherein deployment of the airbag comprises deploying a plurality of chambers that are formed with a single inflator;
   wherein deployment of at least one of the chambers involves deployment of a door arm rest chamber as to extend above and below a door arm rest in a vehicle vertical direction and into direct contact with the occupant; and
   wherein deployment of at least another of the chambers involves deployment of a chest chamber that is positioned and configured to protect a chest region of the occupant and so as to secure a space between the vehicle sidewall and the occupant; and wherein deployment of the airbag involves a pressure valve, that is positioned in a rearward region of the door arm rest chamber and in flow communication between the chest chamber and the door arm rest chamber.

8. The occupant protection method of claim 7 wherein the chest chamber and inflator relationship is such that the chest chamber deployment initiation occurs only after deployment initiation of the door arm rest chamber.

9. The occupant protection method of claim 7 wherein the pressure valve is positioned as to be at a rearward region of the chest chamber upon deployment of the chest chamber.

10. The occupant protection method of claim 7 wherein the inflator is arranged on a same level with the arm rest in the vehicle vertical direction.

11. The occupant protection method of claim 7 wherein said at least one chamber comprises an upper chamber that can be deployed above the door arm rest and a lower chamber that can be deployed below the door arm rest, and wherein said at least one chamber includes a non-inflated portion positioned between the upper and lower chambers and which non-inflated portion is arranged as to be deployed on a common level with the arm rest in the vertical direction.

\* \* \* \* \*